US012552182B2

(12) United States Patent
Nagase et al.

(10) Patent No.: US 12,552,182 B2
(45) Date of Patent: Feb. 17, 2026

(54) RECORDING APPARATUS

(71) Applicant: CANON KABUSHIKI KAISHA, Tokyo (JP)

(72) Inventors: Tomoyuki Nagase, Kanagawa (JP); Toshiro Sugiyama, Kanagawa (JP); Toshinobu Tokita, Kanagawa (JP); Waichiro Saiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 18/538,468

(22) Filed: Dec. 13, 2023

(65) Prior Publication Data

US 2024/0208244 A1 Jun. 27, 2024

(30) Foreign Application Priority Data

Dec. 27, 2022 (JP) ................................ 2022-210334

(51) Int. Cl.
*B41J 11/00* (2006.01)

(52) U.S. Cl.
CPC ................................ *B41J 11/0022* (2021.01)

(58) Field of Classification Search
CPC .................................................. B41J 11/0022
See application file for complete search history.

(56) References Cited

U.S. PATENT DOCUMENTS

| | | | |
|---|---|---|---|
| 6,367,906 | B1 | 4/2002 | Hiramatsu |
| 6,390,618 | B1 | 5/2002 | Wotton |
| 9,579,896 | B2 | 2/2017 | Imahashi |
| 9,701,122 | B2 | 7/2017 | Arimizu |
| 9,987,858 | B2 | 6/2018 | Perez Gellida |
| 11,207,904 | B2 | 12/2021 | Koda |
| 11,254,146 | B2 | 2/2022 | Nagase |
| 11,590,780 | B2 | 2/2023 | Nagase |
| 11,813,854 | B2 | 11/2023 | Nagase |
| 2004/0017453 | A1 | 1/2004 | Hay |

FOREIGN PATENT DOCUMENTS

| | | | |
|---|---|---|---|
| JP | H11-138780 A | | 5/1999 |
| JP | 2009292128 A | * | 12/2009 |
| JP | 2009292129 A | * | 12/2009 |

OTHER PUBLICATIONS

May 2, 2024 European Official Action in European Patent Appln. No. 23217169.4.

* cited by examiner

*Primary Examiner* — Justin Seo
(74) *Attorney, Agent, or Firm* — Venable LLP

(57) ABSTRACT

Disclosed is a recording apparatus including: a platen that supports a recording medium conveyed by a conveyance unit; a carriage that supports a recording head so as to be opposed to the platen and moves in a scanning direction; and a blowing unit for sending air to the recording medium supported by the platen, wherein the carriage has a recessed portion opposed to a blowing port of the blowing unit.

18 Claims, 15 Drawing Sheets

RECORDING APPARATUS

BACKGROUND OF THE INVENTION

Field of the Invention

The present invention relates to a recording apparatus that dries a recording liquid on a recording medium.

Description of the Related Art

Liquid ejection type recording apparatuses as represented by inkjet recording apparatuses desirably have the capability of printing high-quality images on recording media even under low-temperature or high-temperature surrounding environments. However, for example, under a low-temperature environment, so-called aqueous ink based on water as a recording liquid is hardly dried on a recording medium onto which the aqueous ink has been ejected, and may therefore adversely affect printing quality. In recent years, mounting of a printing zone blowing mechanism for drying ink on a recording medium has been proposed to tackle such a printing quality problem (U.S. Pat. No. 9,987,858). The printing zone blowing mechanism enables promotion of drying of ink immediately after ink is dropped onto a recording medium by performing blowing on the recording medium. Thus, degradation of printing quality may be suppressed.

SUMMARY OF THE INVENTION

However, in blowing by the printing zone blowing mechanism, air hits not only a recording medium but also a recording head scanning the recording medium or a carriage holding the recording head and performing scanning in some cases. Particularly, when air intrudes into a space between the recording head and the recording medium, ink ejected from the recording head is affected by the air before reaching the recording medium. There is a concern that the ink does not reach a target position on the recording medium due to the influence of the air.

The present invention has an object of providing a technology enabling drying of a recording liquid without affecting a recording operation.

In order to achieve the above object, a recording apparatus according to the present invention includes following units:

- a conveyance unit configured to convey a recording medium;
- a platen configured to support the recording medium conveyed by the conveyance unit;
- a carriage configured to support a recording head and configured to move in a scanning direction; and
- a blowing unit configured to send air to the recording medium supported by the platen, wherein
- the carriage has a recessed portion opposed to a blowing port of the blowing unit.

In order to achieve the above object, a recording apparatus according to the present invention includes following units:

- a conveyance unit configured to convey a recording medium;
- a platen configured to support the recording medium conveyed by the conveyance unit;
- a carriage configured to support a recording head and configured to move in a scanning direction; and
- a blowing unit configured to send air to the recording medium supported by the platen, wherein

- the carriage has a change portion that changes a direction of the air sent by the blowing unit.

According to the present invention, it is possible to dry a recording liquid without affecting a recording operation.

Further features of the present invention will become apparent from the following description of exemplary embodiments with reference to the attached drawings.

DESCRIPTION OF THE EMBODIMENTS

Hereinafter, embodiments for carrying out the present invention will be exemplarily described in detail on the basis of examples with reference to the drawings. Note that the dimensions, materials, shapes, their relative arrangements, or the like of constituting components described in the embodiments should be appropriately changed depending on the configurations of a device to which the present invention is applied or various conditions. Further, all combinations of features described in the embodiments are not necessarily essential for the solving means of the present invention. Constituting elements described in the embodiments are given only for exemplification, and do not intend to limit the scope of the present invention.

First Embodiment

A recording apparatus according to a first embodiment of the present invention will be described with reference to FIGS. 1 to 8 and FIG. 15. Here, a liquid ejection type recording apparatus (inkjet recording apparatus) that ejects ink onto a recording medium as a recording liquid to record an image or the like on the recording medium will be described as an example of a recording apparatus 1 according to the first embodiment of the present invention.

Figure 1:
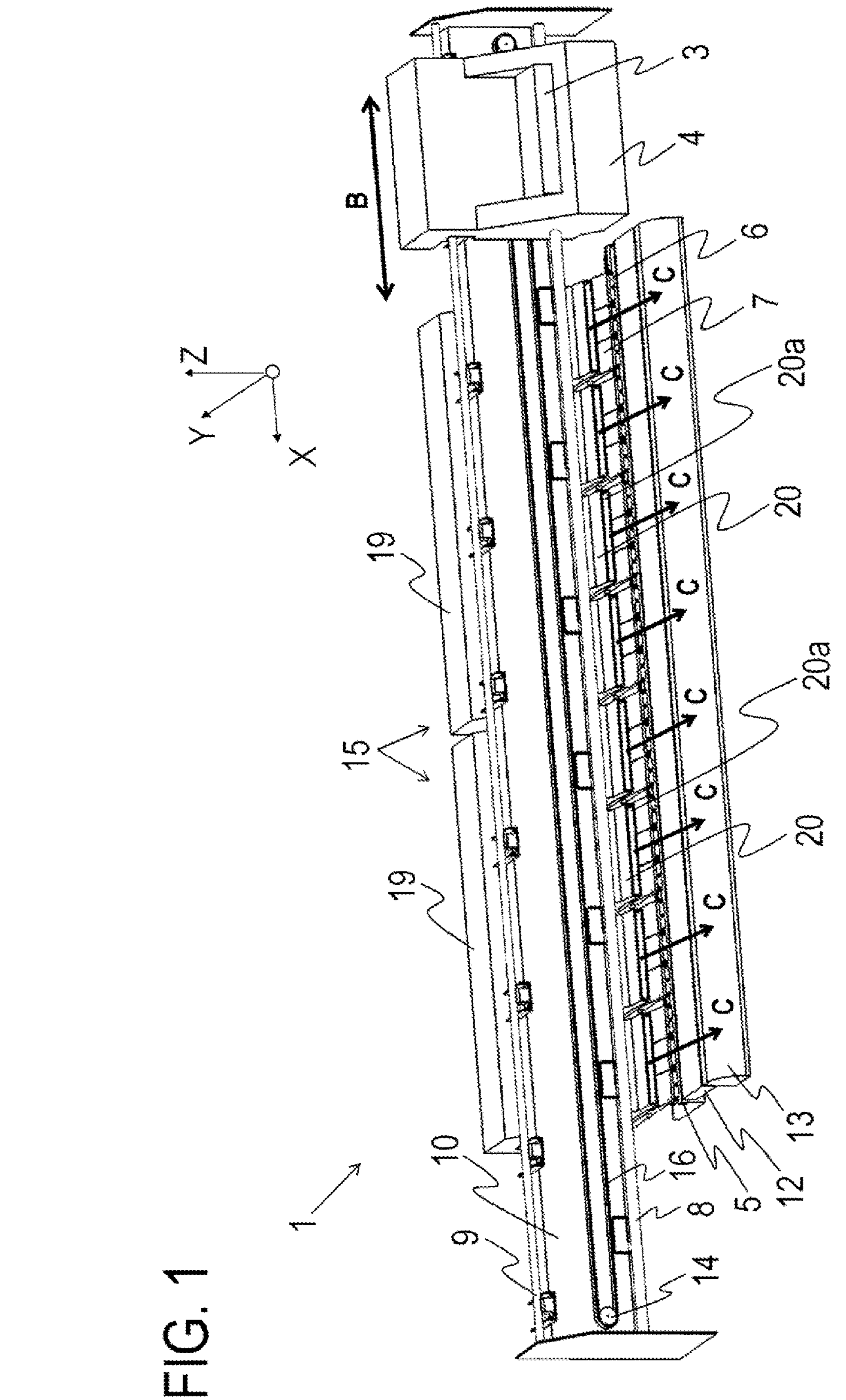
FIG. 1 is a perspective view around a recording portion of a recording apparatus according to a first embodiment of the present invention.
Figure 2:
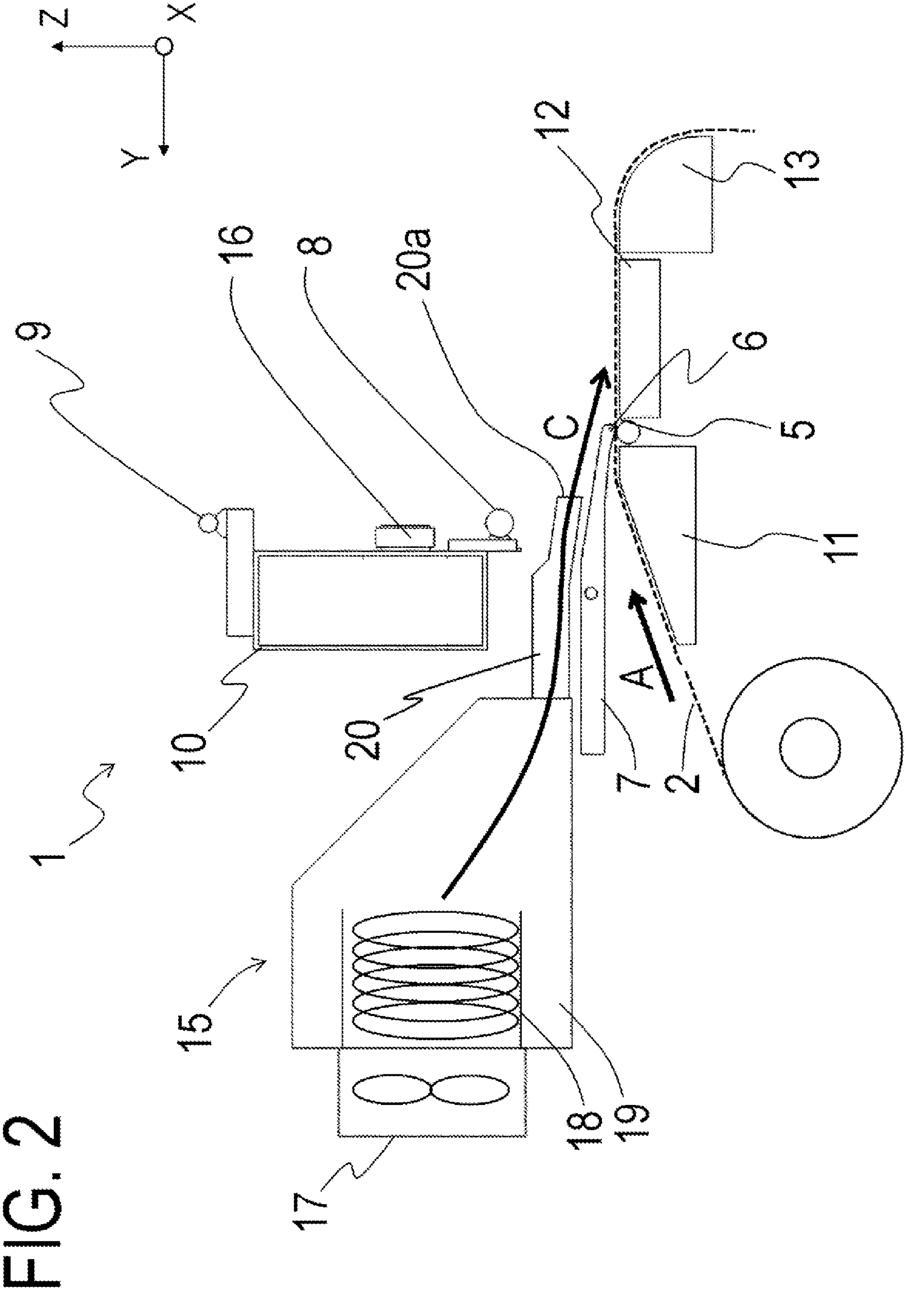
FIG. 2 is a cross-sectional view around the recording portion of the recording apparatus according to the first embodiment of the present invention.

FIG. 1 is a schematic perspective view showing an outline configuration around a recording portion in the recording apparatus according to the present example. FIG. 2 is a schematic cross-sectional view of FIG. 1 (along a Y-direction and a Z-direction) perpendicular to an X-direction parallel to a main scanning direction in a recording operation.

Figure 3:
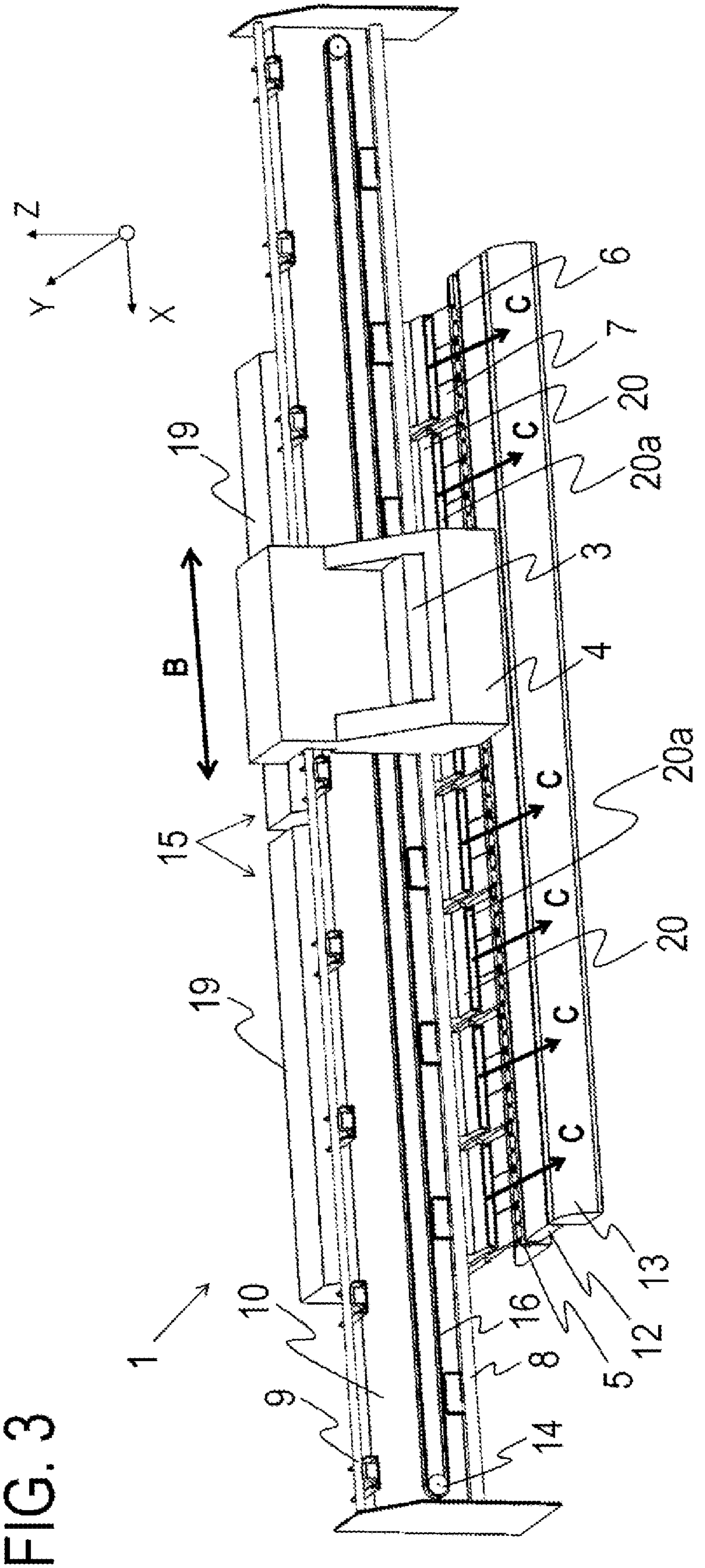
FIG. 3 is a perspective view showing an operation during scanning of a platen by a carriage.

Note that in FIGS. 1, 2, and 3 and the following figures, the X-direction indicates a direction along the main scanning direction (a reciprocating direction of a recording head) in a recording operation as described above, that is, a width direction of a recording medium. Further, the Y-direction indicates a conveying direction of the recording medium, that is, a direction along a sub-scanning direction. Moreover, the Z-direction indicates a direction along a vertical direction (gravity direction), that is, a direction perpendicular to a non-recording surface of the recording medium. In the respective figures, the recording apparatus 1 is installed horizontally on an installation surface perpendicular to the vertical direction as a general use state.

As shown in FIGS. 1 and 2, the recording apparatus 1 has a rolled recording medium (roll sheet) 2 mounted therein. The recording medium 2 is held between a conveying roller 5 and a pinch roller (roller) 6 serving as conveyance unit, and the pinch rollers 6 press the recording medium 2 toward a direction of the conveying roller 5 by a spring not shown to hold the same.

The recording medium 2 is conveyed onto a platen 12 by a friction force generated at the holding portion between the conveying roller 5 and the pinch rollers 6 when the conveying roller 5 rotates in a state in which the recording medium 2 is held by the conveying roller 5 and the pinch rollers 6 (in a direction as indicated by an arrow A). Note that the recording medium 2 is held by the conveying roller 5 and the pinch rollers 6 and conveyed. Therefore, the length in the width direction (X-direction) (the length in a direction crossing the conveying direction) of the recording medium 2 needs to be equal to or not more than the widths of the conveying roller 5 and the pinch rollers 6.

On the platen 12, a recording head 3 and a carriage 4 that holds the recording head 3 are provided. The carriage 4 is supported by a frame 10, a main rail 8, and a sub-rail 9. Further, the carriage 4 is coupled to a carriage motor 14 via a belt 16. The carriage 4 is towed by the coupled belt 16 when the carriage motor 14 normally rotates and rotates in a reverse direction, and performs a reciprocating operation on the platen 12 along the main rail 8 that serves as a guide rail (in a direction as indicated by an arrow B).

On the recording medium 2 that has been conveyed onto the platen 12, recording is performed by ink ejected from ejection port rows formed on an ejection port surface 30 of the recording head 3 mounted in the carriage 4 in a process in which the carriage 4 performs a reciprocating operation on the recording medium 2. During the recording, air is sent to the recording medium 2 that has been conveyed onto the platen 12 from blowing units 15 that serve as a blowing portion, whereby drying of the ink recorded on the recording medium 2 is promoted.

Each of the blowing units 15 is composed of a blowing fan 17, a blowing duct 19, and a duct nozzle 20. The blowing unit 15 enables air generated by the blowing fan 17 to pass through the blowing duct 19 and the duct nozzle 20 connected to the blowing duct 19 to be sent (as indicated by an arrow C). Further, in the case of further promoting the drying, provision of a heater 18 on the downstream side of the blowing fan 17 enables heat to be applied to the air sent from the blowing fan 17 and hot air to be sent to the recording medium 2.

The duct nozzle 20 is provided above a pinch roller holder (roller holding member) 7 and an upstream platen 11 and below the main rail 8 and the frame 10. An outlet (blowing port) **20*a* of the duct nozzle 20 is arranged to be on the downstream side of the main rail 8 and on the upstream side of the conveying roller 5 and the pinch rollers 6 in the conveying direction (the direction as indicated by the arrow A or the direction opposite to the Y-direction) of the recording medium 2. Further, the duct nozzle 20 is provided to have a downward shape toward a downstream side in the conveying direction to send the air to the recording medium 2 on the platen 12, and the air is configured to be oriented in the conveying direction of the recording medium 2 on the platen 12**.

Further, as shown in FIG. 1, the duct nozzles 20 are arrayed at even intervals along the reciprocating direction (the direction as indicated by the arrow B, the X-direction) of the recording head 3 (carriage 4). According to a reciprocating position of the recording head 3, some of the plurality of duct nozzles 20 are opposed in the conveying direction A (the Y-direction) of the recording medium 2 with respect to the recording head 3 (carriage 4).

The recording medium 2 having completed recording and blowing/drying operations as described above is further conveyed by the conveying roller 5, and discharged to the outside of the apparatus via an area on a downstream platen 13.

Figure 15:
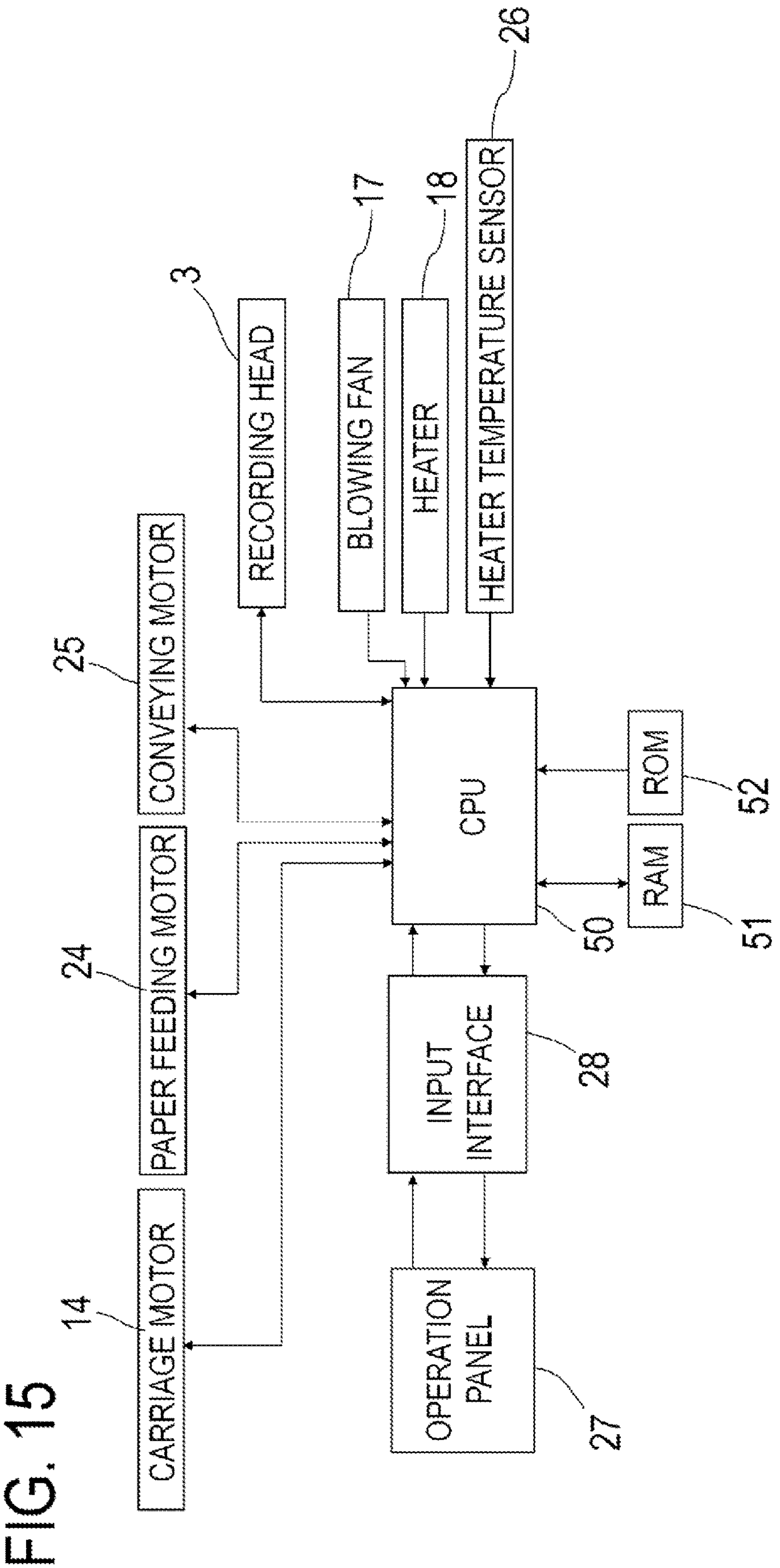
FIG. 15 is a block diagram showing the control configuration of the recording apparatus.

FIG. 15 is a block diagram for describing a configuration example of a control system in the recording apparatus 1. A CPU 50 controls respective units of the recording apparatus 1 including a carriage motor 14, a paper feeding motor 24, and a conveying motor 25 according to a control program stored in a ROM 52. Various setting information or the like such as the type and the width of the recording medium 2 and a setting temperature of the heater 18 is input to the CPU 50 from an operation panel 27 via an input interface 28. Further, the CPU 50 writes and reads information on the recording medium 2 or the like in and from a RAM 51. The output of the carriage motor 14, the paper feeding motor 24, the conveying motor 25, the recording head 3, the blowing fan 17, and the heater 18 is controlled by the CPU 50 on the basis of a detected temperature of a heater temperature sensor 26 or a stipulated value written in the ROM 52. That is, scanning of the carriage 4, conveying of the recording medium 2, and driving control of the heater 18 and the blowing fan 17 are performed.

Figure 4:
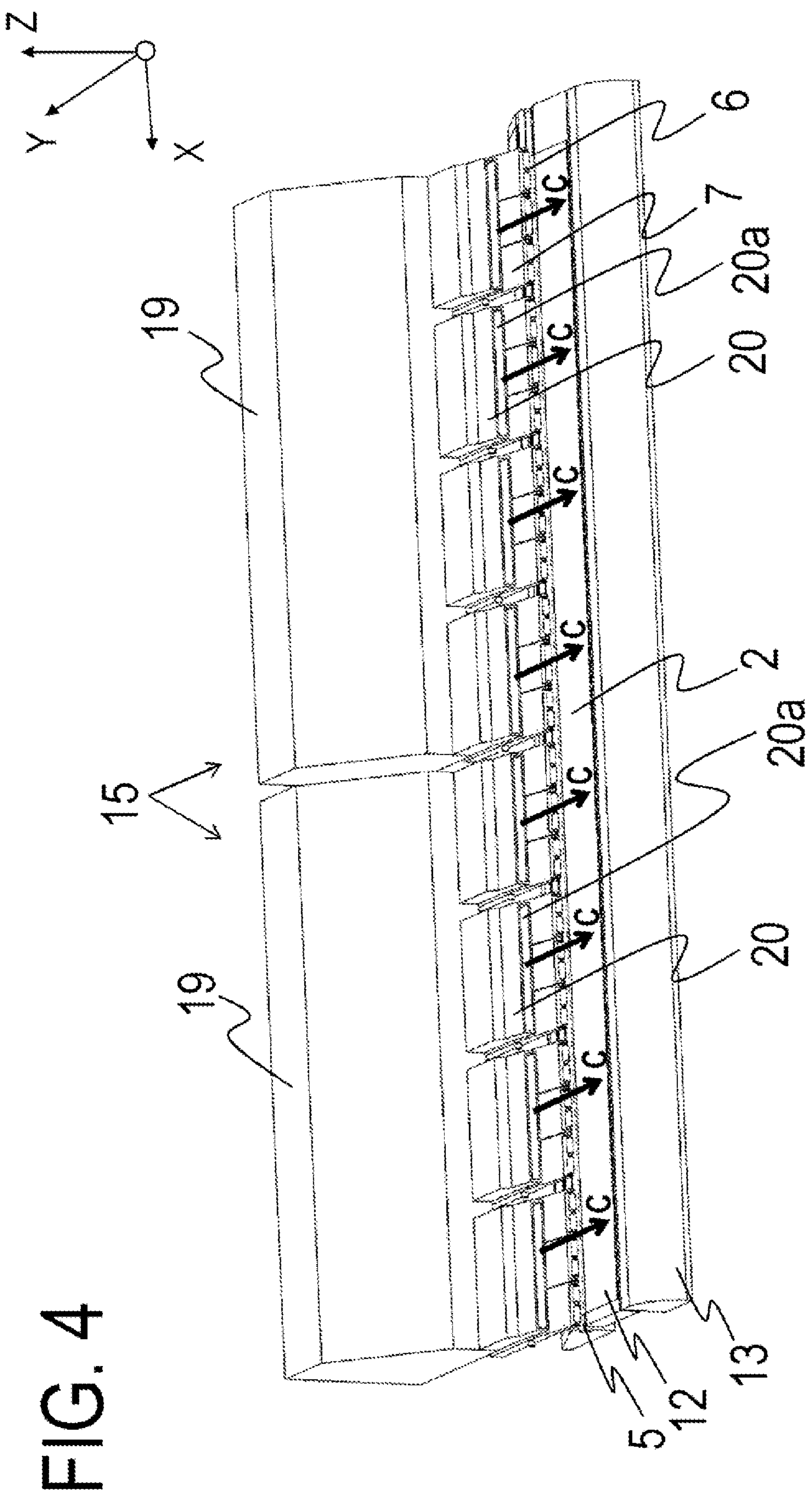
FIG. 4 is a perspective view showing the positional relationship between blowing units and the platen.
Figure 5:
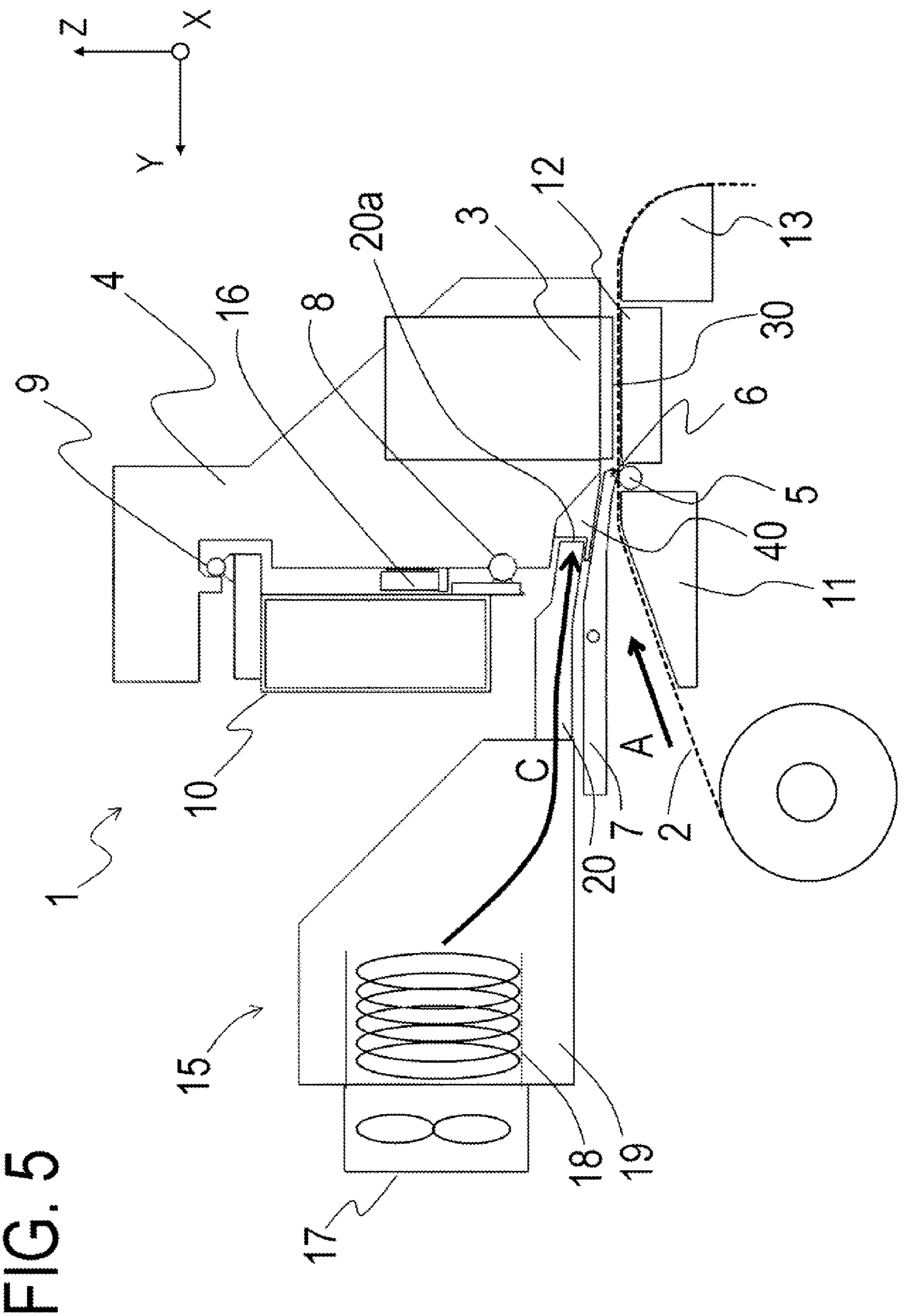
FIG. 5 is a cross-sectional view showing an operation during scanning of the platen by the carriage.

The relationship between blowing and the operation of the carriage 4 during a recording operation will be described with reference to FIGS. 3 to 5. FIGS. 3 to 5 show a state during scanning of the platen 12 by the carriage 4 in the direction as indicated by the arrow B to perform recording. FIG. 3 is a schematic perspective view showing an outline configuration around the recording portion in the recording apparatus according to the present example. FIG. 4 is a schematic perspective view showing the positional relationship between the blowing units 15 and the platen 12 in FIG. 3. FIG. 5 is a schematic cross-sectional view of FIG. 3 perpendicular to the main scanning direction (the direction as indicated by the arrow B) during scanning by the carriage 4.

As described above, the blowing units 15 send air from the duct nozzles 20 to the platen 12. Here, when the carriage 4 reaches a position at which the carriage 4 overlaps the duct nozzles 20 in the main scanning direction, as shown in FIG. 5 air C sent from the duct nozzles 20 hits an air shielding portion 40 of the carriage 4 before reaching the platen 12.

Figure 6:
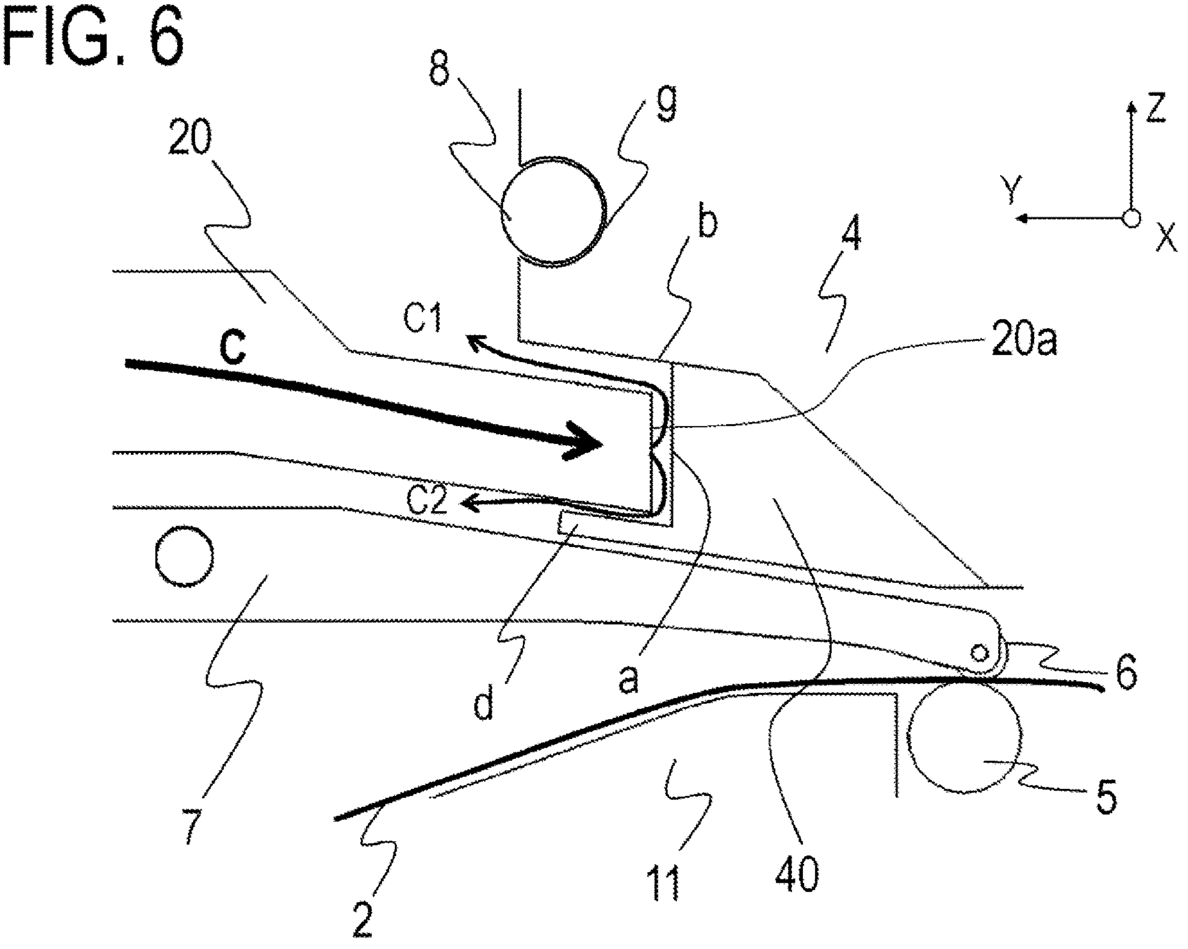
FIG. 6 is a detail view of FIG. 5 showing a state in which sent air hits the carriage.
Figure 7:
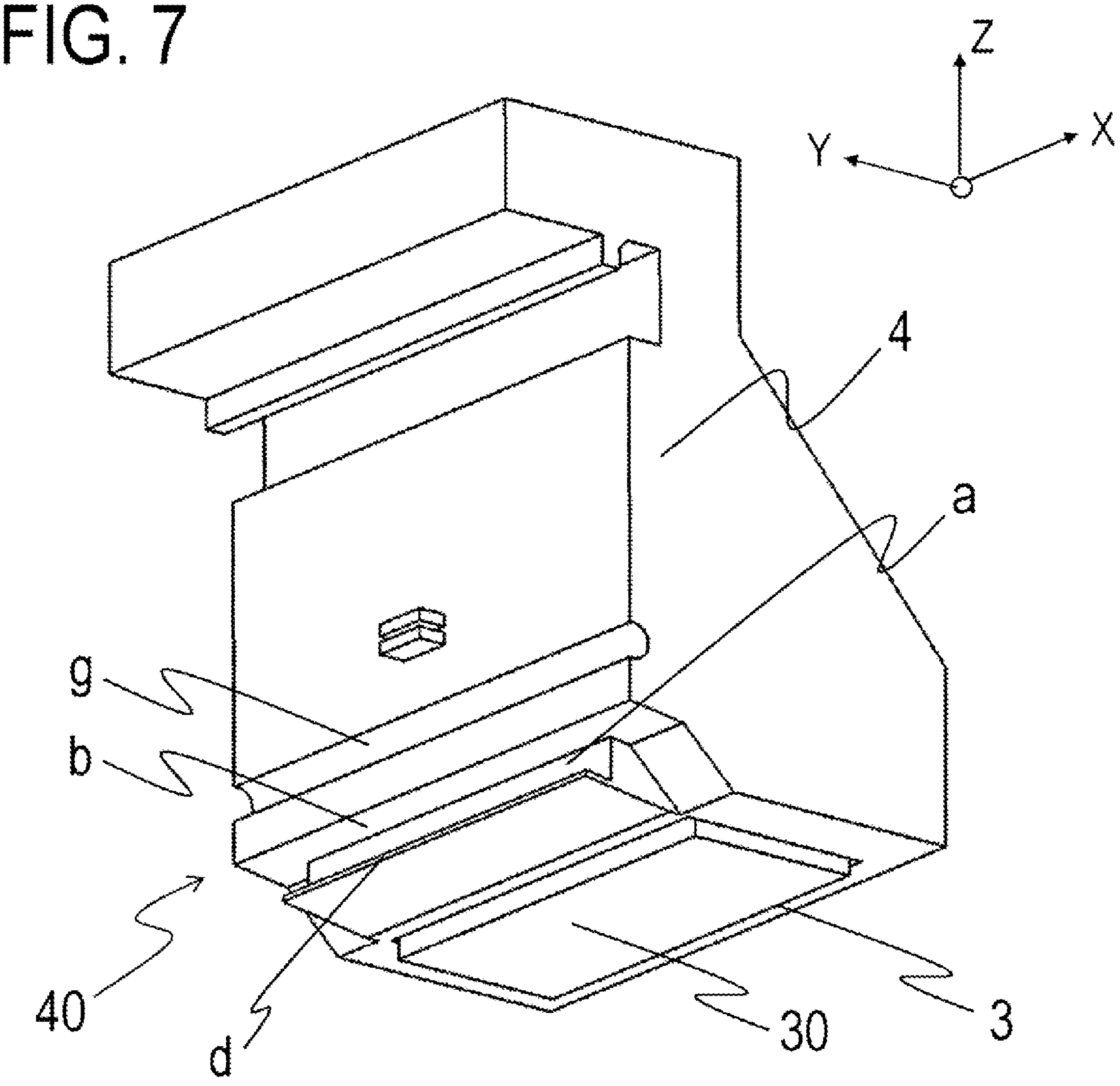
FIG. 7 is a perspective view of the carriage according to the first embodiment of the present invention.
Figure 8:
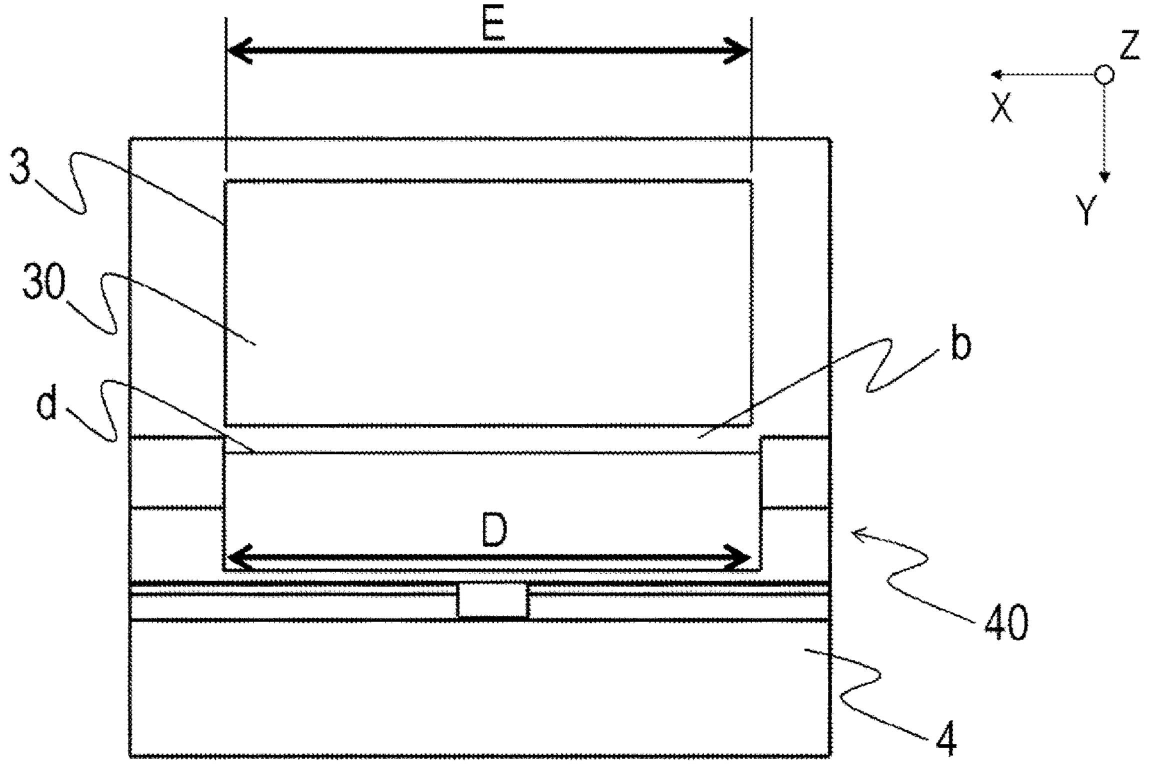
FIG. 8 is a lower surface view of the carriage according to the first embodiment of the present invention.

A state in which the air C hits the carriage 4 will be described with reference to FIGS. 5 to 8. FIG. 5 is a schematic cross-sectional view of FIG. 3 perpendicular to the main scanning direction at a position corresponding to a position of the carriage 4 during scanning of the platen 12. FIG. 6 is a detail view of FIG. 5 showing a state in which the air C hits the carriage 4. FIG. 7 is a schematic perspective view showing the configuration of the carriage 4 when the ejection port surface (nozzle surface) 30 of the recording head 3 is viewed obliquely from its lower side. FIG. 8 is a schematic lower surface view of the carriage 4 when viewed from a direction opposed to the ejection port surface (nozzle surface) 30 of the recording head 3.

The duct nozzle 20 is provided at a position close to a movement path of the carriage 4, and the tip of an outlet 20*a* at the tip end of the duct nozzle 20 is configured to be covered with the air shielding portion 40 of the carriage 4 that is a recessed portion when the carriage 4 reaches an opposed position. Further, the outlet 20*a* at the tip end of the duct nozzle 20 is provided above a conveying path of the recording medium 2. More specifically, the outlet 20*a* is positioned below and on a downstream side in the conveying direction with respect to a supported surface g supported by the main rail 8 in the carriage 4, and positioned above and on an upstream side in the conveying direction with respect to the recording head 3.

As shown in FIGS. 6 to 8, the air shielding portion 40 is configured to have surfaces a, b, and d near a part (lower part) at which the recording head 3 is mounted in the carriage 4.

The surface a is provided so as to be opposed to the outlet 20*a* of the duct nozzle 20 that is a blowing outlet in the blowing direction (the direction as indicated by the arrow C). The surface b is provided so as to be opposed from an upper side to a lower side (from one side to the other side in a direction crossing the blowing direction) with respect to an upper part of the outlet 20*a* of the duct nozzle 20. The surface d is provided so as to be opposed from the lower side to the upper side (from the other side to the one side in the direction crossing the blowing direction) with respect to a lower part of the outlet 20*a* of the duct nozzle 20. That is, the surfaces b and d are arranged so as to be opposed to each other in a vertical direction (Z-direction).

Further, the surface b is connected to the surface a so as to extend from an upper end (one end in the direction crossing the blowing direction) of the surface a to a downstream side in the Y-direction. The surface d is connected to the surface a so as to extend from a lower end (the other end in the direction crossing the blowing direction) of the surface a to the downstream side in the Y-direction. Moreover, the surfaces b and d are formed to be inclined toward the upper side as separated from the recording head 3. The direction is opposite to a direction in which the air is guided to the outlet 20*a* in the duct nozzle 20.

The surfaces a, b, and d are configured to form a recessed surface in a substantially sideways position when viewed from the main scanning direction (X-direction). Widths D in the main scanning direction (X-direction) of the surfaces a, b, and d are equal to or not less than a width E of the recording head 3.

When blowing starts from the duct nozzle 20, the air C hits the surface a of the air shielding portion 40 of the carriage 4 and is divided into air C1 toward the direction of the upper part at which the surface b is positioned and air C2 toward the direction of the lower part at which the surface d is positioned. The air C1 flows to the upper part along the surface a and then flows along between the duct nozzle 20 and the surface b of the air shielding portion 40. The air C2 flows to the lower part along the surface a and then flows along between the duct nozzle 20 and the surface d of the air shielding portion 40. As described above, air directions of the air C1 and the air C2 are changed in the direction substantially opposite to the direction of the air C when sent from the duct nozzle 20 by the surfaces a, b, and d of the air shielding portion 40.

The air shielding portion 40 is formed in a shape that is open not only in the direction opposed to the outlet 20*a* of the duct nozzle 20 but also in the main scanning direction. That is, the air shielding portion 40 is formed in such a shape as to be capable of causing the air blown out from the outlet 20*a* of the duct nozzle 20 to be vertically detoured in the Z-direction and released in the direction opposite to the conveying direction of the recording medium 2 and released horizontally in the X-direction (main scanning direction). That is, the air shielding portion 40 is a configuration portion that controls a flow of the air so that an advancing direction of the air from the outlet 20*a* of the duct nozzle 20 is deviated from the periphery of the ejection port surface 30. That is, the air shielding portion 40 functions as a change portion that changes a direction of the air sent from the blowing unit 15.

Note that, when other duct nozzles 20 are adjacently arranged in the flowing direction of the air, the flow of the air released horizontally in the X-direction (main scanning direction) may be affected by the air sent from the outlets 20*a* of the duct nozzles 20 and advancing of the air may be blocked. Accordingly, the air is mainly detoured vertically in the Z-direction and turns in the opposite direction as the direction of the air released by the air shielding portion 40.

From the above, the air sent from the outlets 20*a* of the duct nozzles 20 of the blowing units 15 flows through a surface to be recorded of the recording medium 2 on the platen 12 when the carriage 4 is not positioned between the duct nozzles 20 and the platen 12. This blowing enables the promotion of drying of ink immediately after the ink is dropped onto the recording medium 2 and the secured quality of a recording image.

On the other hand, the air direction is changed by the surfaces a, b, and d of the air shielding portion 40 provided in the carriage 4 when the carriage 4 is positioned between the duct nozzles 20 and the platen 12, and the air flows in the direction substantially opposite to the direction in which the air is sent to the platen 12. Thus, the air hardly flows through between the platen 12 and the recording head 3.

As described above, the paths that change the air direction and release the air when the air sent from the duct nozzles 20 hits the carriage 4 are positively provided in the present embodiment. Thus, the air is prevented from flowing into the periphery of the recording area in which the ejection port surface 30 below the recording head 3 and the recording medium 2 are opposed to each other, and the ejection port surface 30 of the recording head 3 may be prevented from being exposed to the air. Thus, ink is prevented from being dried at ejection ports. Further, ink droplets dropped from the ejection ports of the ejection port surface 30 are prevented from causing the occurrence of landing deviation or the scattering of printing mist due to the influence of the air, and the degradation of image quality may be suppressed.

Second Embodiment

A recording apparatus 1*a* according to a second embodiment of the present invention will be described with reference to FIGS. 9 to 14. Here, the points of the second embodiment different from those of the first embodiment will be mainly described. The configurations of the second embodiment common to those of the first embodiment will be denoted by the same symbols, and their descriptions will be omitted. The configurations of the second embodiment that will not be particularly described below are the same as those of the first embodiment.

Figure 9:
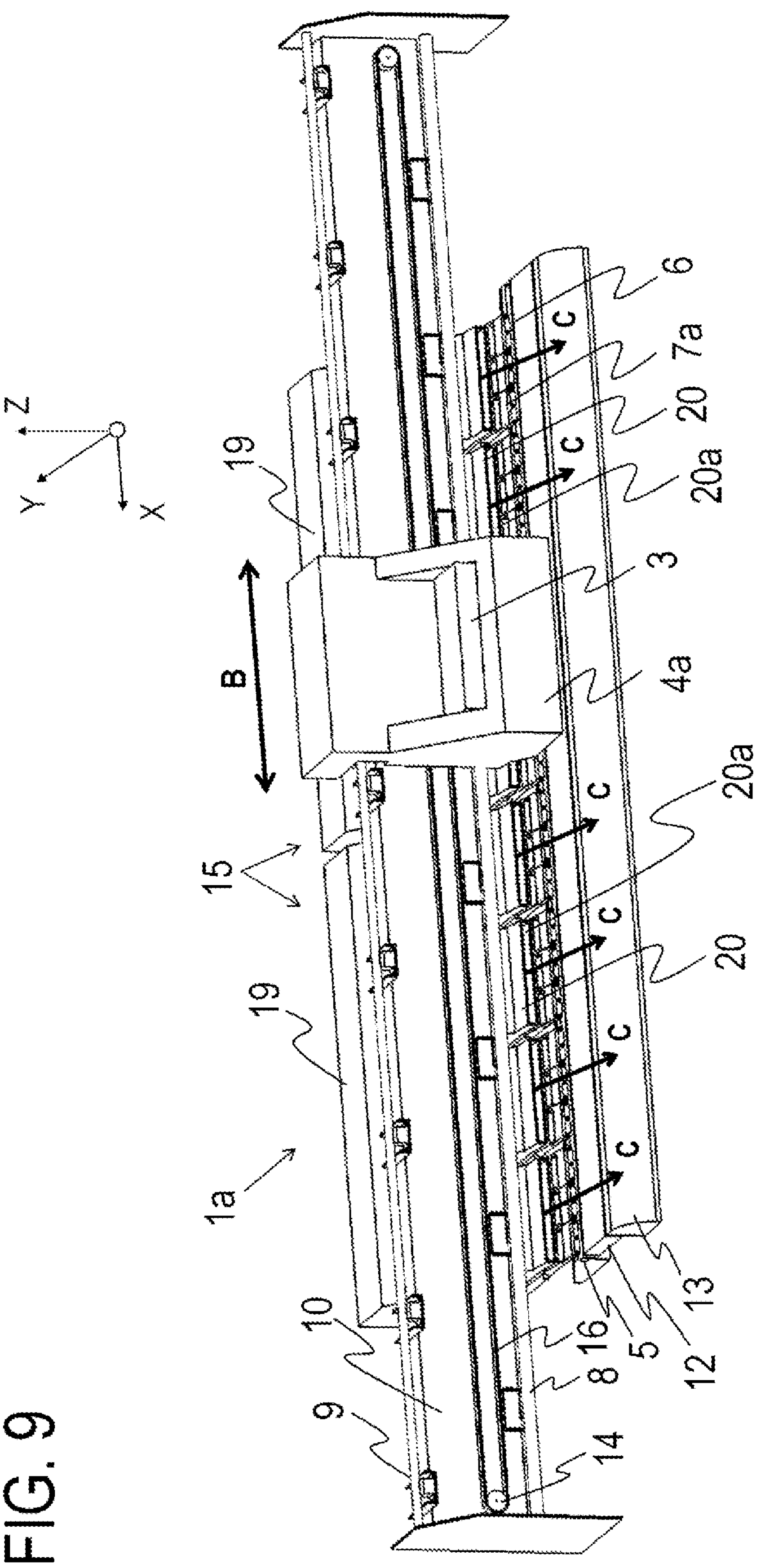
FIG. 9 is a perspective view around a recording portion of a recording apparatus according to a second embodiment of the present invention.
Figure 10:
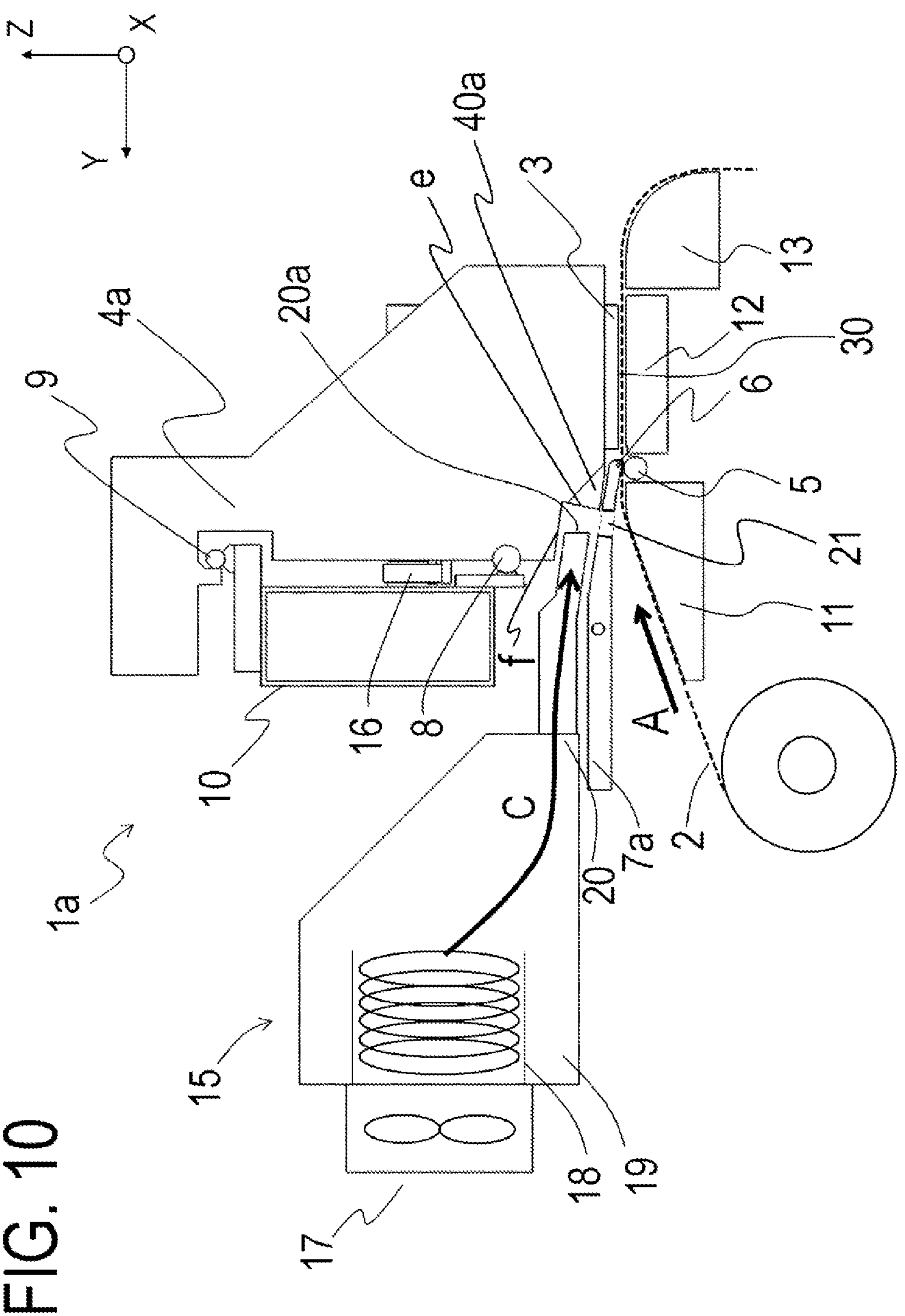
FIG. 10 is a cross-sectional view around the recording portion of the recording apparatus according to the second embodiment of the present invention.

FIG. 9 is a schematic perspective view showing an outline configuration around a recording portion in a recording apparatus according to the present embodiment. FIG. 10 is a schematic cross-sectional view of FIG. 9 (along a Y-direction and a Z-direction) perpendicular to an X-direction parallel to a main scanning direction in a recording operation.

As shown in FIGS. 9 and 10, a conveying method for a recording medium 2, a recording method by scanning with a carriage 4*a* and a recording head 3, and a blowing method of blowing units 15 are the same as those of the first embodiment. Configurations different from those of the first embodiment will be described in detail using FIGS. 11 to 14 that are detail views of respective portions of FIGS. 9 and 10.

Figure 11:
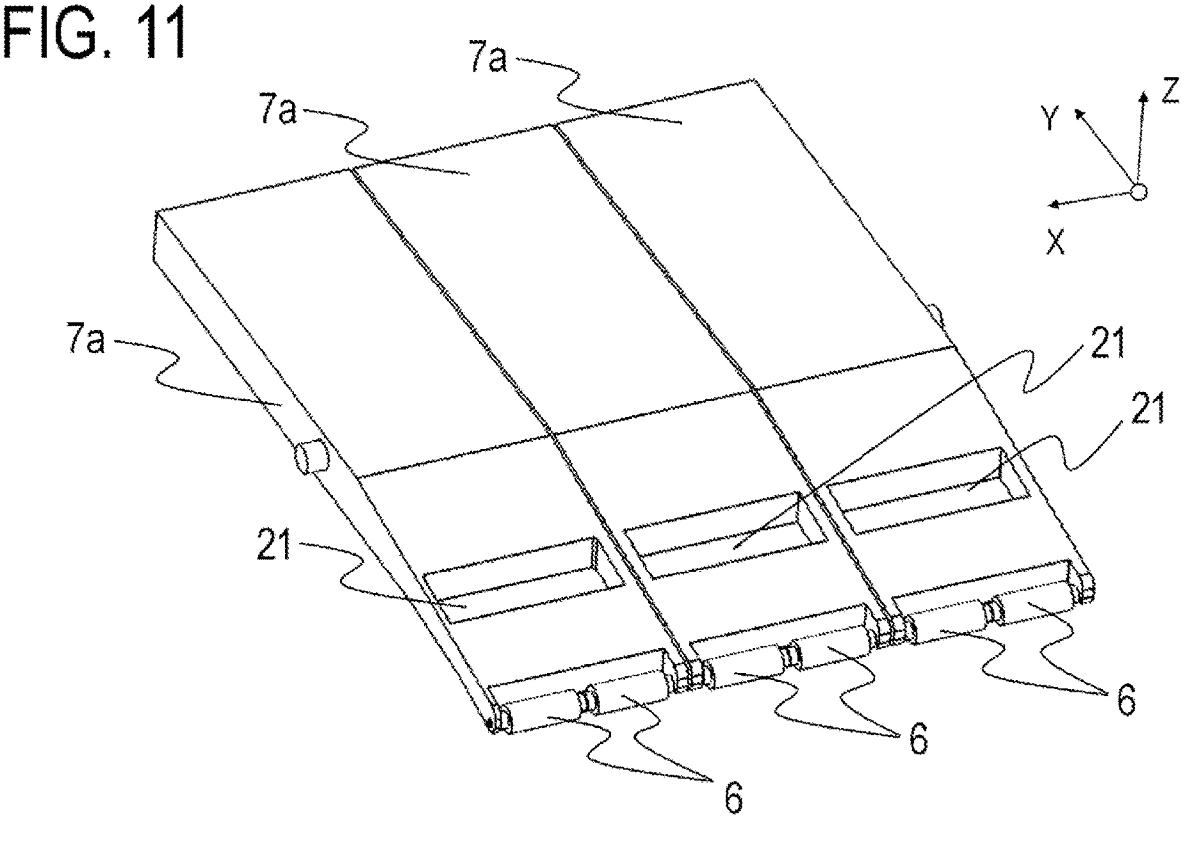
FIG. 11 is a perspective view showing the shape of pinch roller holders according to the second embodiment of the present invention.

FIG. 11 is a perspective view showing the shape of pinch roller holders 7*a* shown in FIGS. 9 and 10. Each of the pinch roller holders 7*a* serving as pressing members holds pinch rollers 6 serving as pressing portions at its end, and has an opening portion 21 penetrating the pinch roller holder 7*a* near the pinch rollers 6. The opening portion 21 is provided in all the pinch roller holders 7*a* arranged side by side along a main scanning direction of the carriage 4*a*. The opening portion 21 is provided at a position separated from a recording area of the recording head 3 and at a higher position than a position at which the pinch roller holder 7*a* presses a surface to be recorded of the recording medium 2 with the pinch rollers 6. Note that the opening portion 21 may be configured to be provided in some of the pinch roller holders 7*a*.

Figure 12:
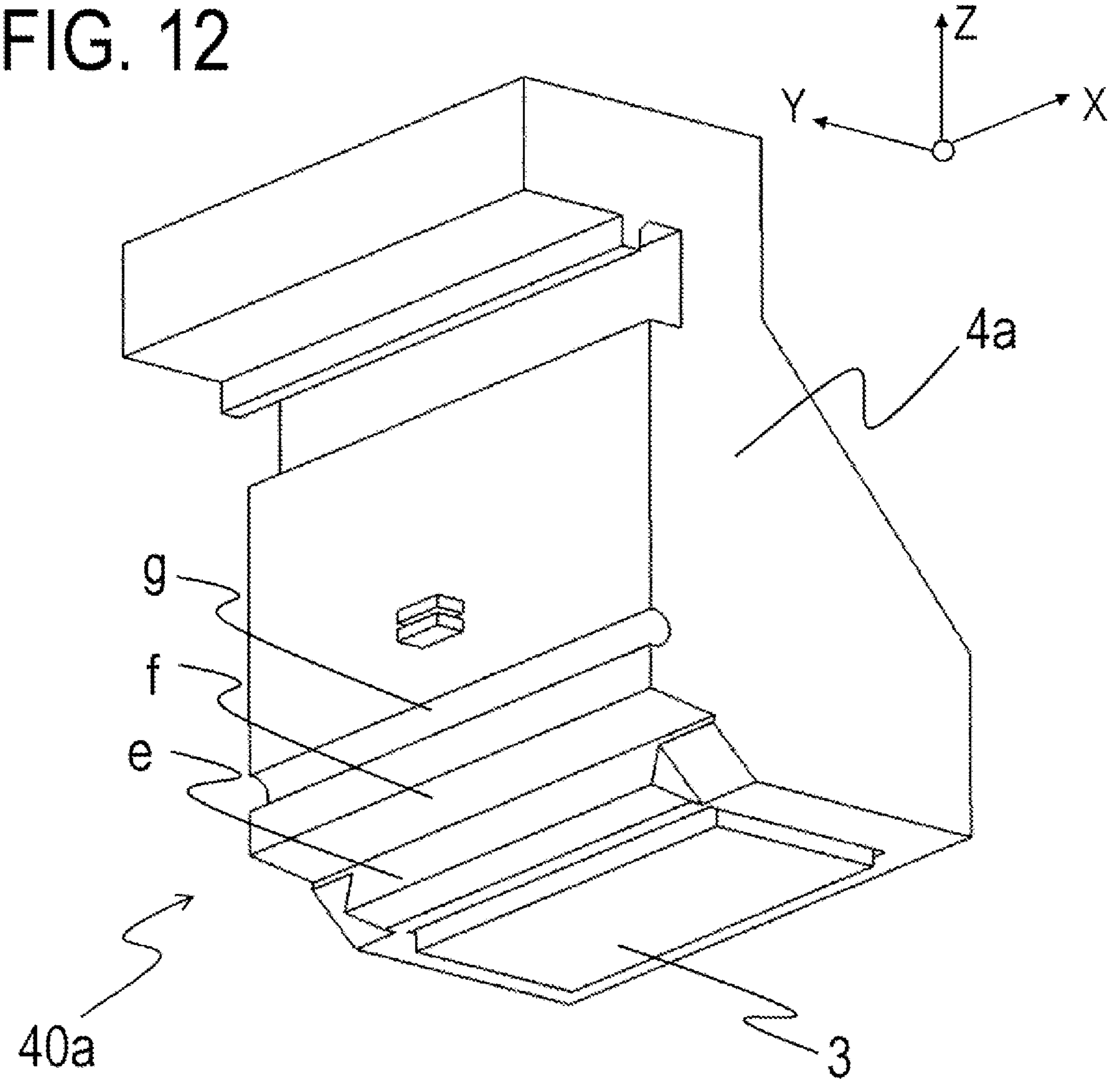
FIG. 12 is a perspective view showing the shape of a carriage according to the second embodiment of the present invention.
Figure 13:
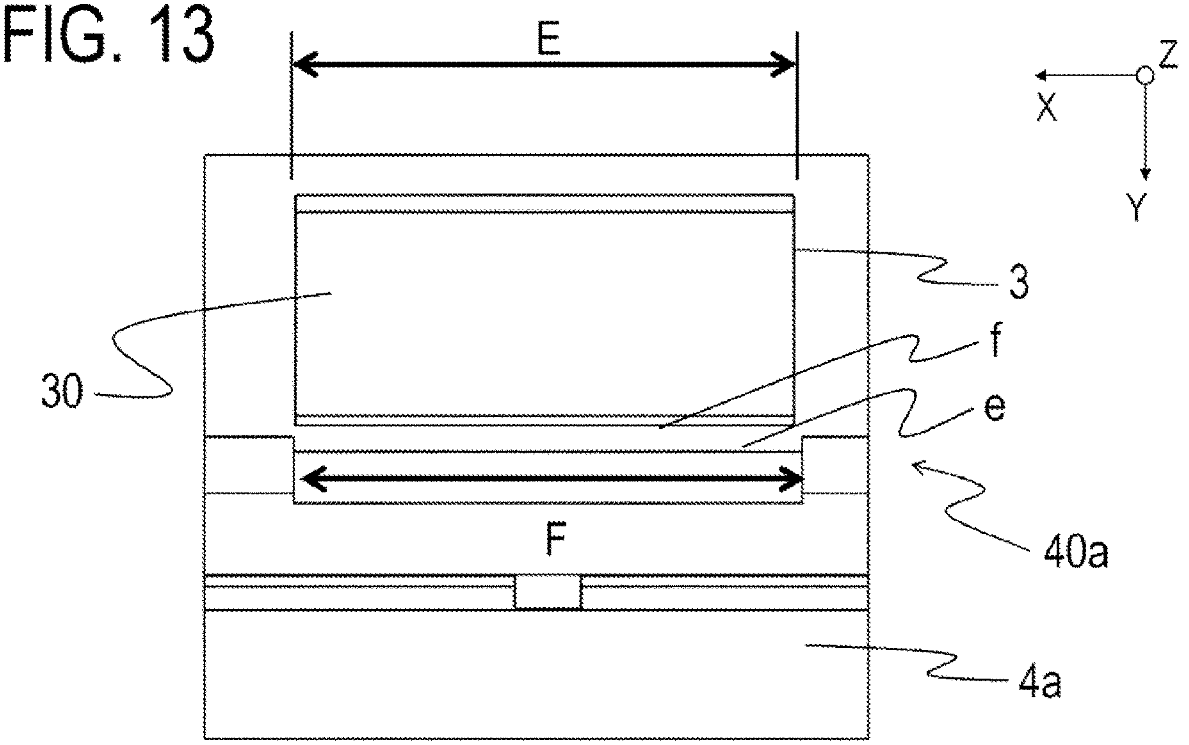
FIG. 13 is a lower surface view showing the shape of the carriage according to the second embodiment of the present invention.

FIG. 12 is a schematic perspective view showing the configuration of the carriage 4*a* when an ejection port surface (nozzle surface) 30 of the recording head 3 is viewed from its lower side. FIG. 13 is a schematic lower surface view of the carriage 4*a* when viewed from a direction opposed to the ejection port surface (nozzle surface) 30 of the recording head 3.

In the carriage 4 of the first embodiment, the air shielding portion 40 including the surface a (first surface), the surface b (second surface), and the surface d (third surface) is provided. However, in the carriage 4*a* of the second embodiment, a air shielding portion 40*a* including a surface e (first surface) and a surface f (second surface) is provided. Widths F of the surfaces e and f of the air shielding portion 40*a* are set to be equal to or at least a width E of the recording head 3.

Figure 14:
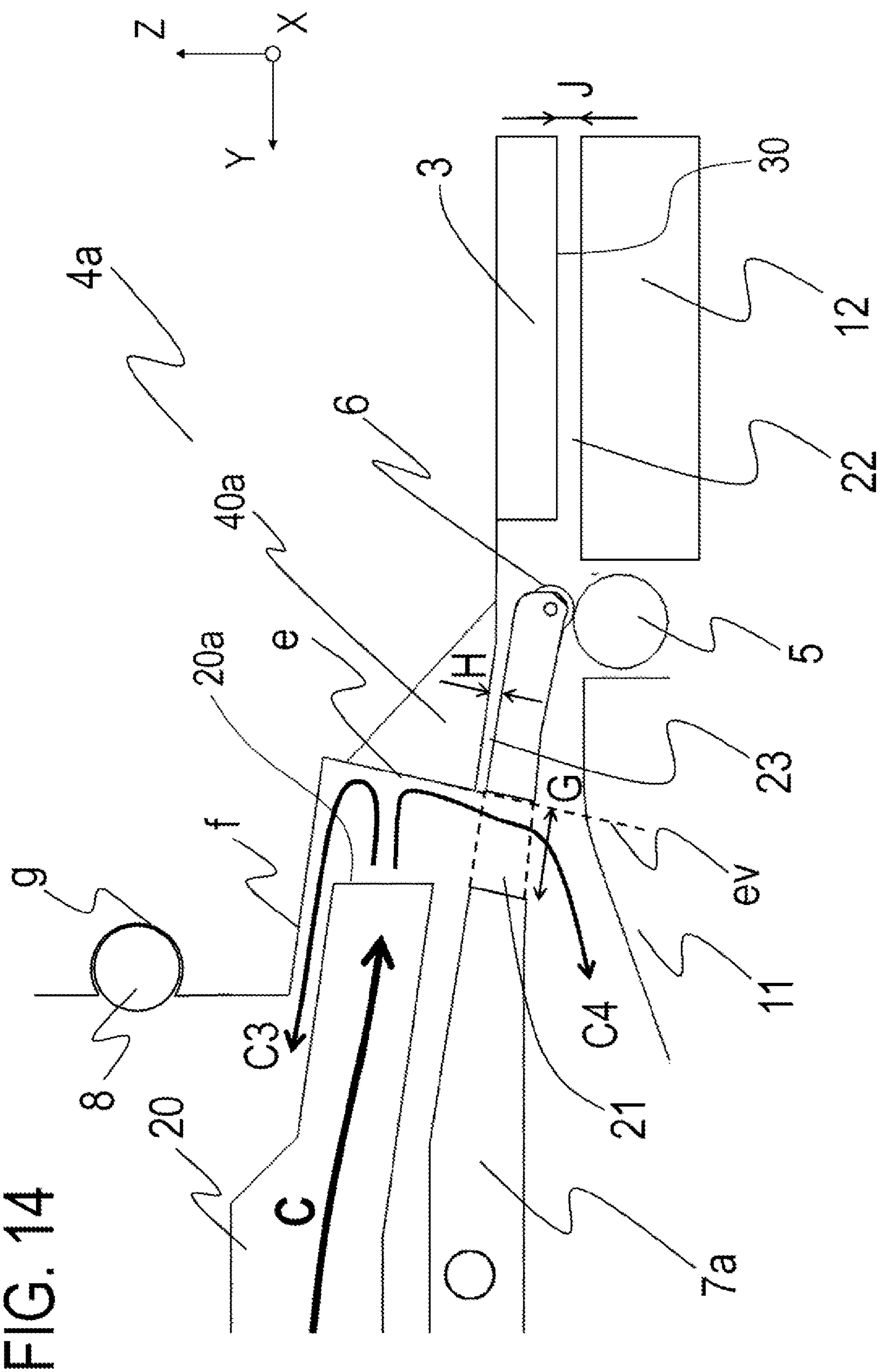
FIG. 14 is a detail view of FIG. 10 showing a state in which sent air hits the carriage.

An opening portion 21 provided in the pinch roller holder 7*a* and the surface e of the carriage 4*a* will be described in detail with reference to FIG. 14. FIG. 14 is a detail view showing a flow of air near a duct nozzle 20 in FIG. 10.

The duct nozzle 20 is provided above the pinch roller holder 7*a* and an upstream platen 11 and below a main rail 8 and a frame 10 (see FIG. 10). Further, an outlet 20*a* that is a blowing outlet of the duct nozzle 20 is arranged to be on the downstream side of the main rail 8 and on the upstream side of a conveying roller 5 and pinch rollers 6 in a conveying direction of the recording medium 2. Further, the duct nozzle 20 is provided to have a downward shape toward a downstream side in the conveying direction to send air to the recording medium 2 on a platen 12, and the air is configured to be oriented in the conveying direction of the recording medium 2 on the platen 12.

The air shielding portion 40*a* is configured to have the surfaces e and f near a portion (lower part) at which the recording head 3 is mounted in the carriage 4*a*. The surfaces e and f of the air shielding portion 40*a* are positioned on an upper side in a vertical direction (Z-direction) and on an upstream side in the conveying direction of the recording medium 2 with respect to the recording head 3, the pinch rollers 6, and the conveying roller 5.

The surface e is positioned on the downstream side of the duct nozzle 20 and a supported surface g that holds the main rail 8 in the carriage 4*a* in the conveying direction of the recording medium 2. Further, the surface e is placed at a position opposed to the outlet 20*a* that is the blowing outlet of the duct nozzle 20. Further, the surface e is provided so that the opening portion 21 of the pinch roller holder 7*a* is positioned in an extending direction of a surface lower end portion of the surface e. That is, the pinch roller holder 7*a* has an area crossing an imaginary extended surface ev obtained by imaginarily extending the e surface downward, and the opening portion 21 vertically penetrates at a position including the area. Further, the opening portion 21 is provided at a position opposed to at least a part of the surface f.

The surface f is provided so as to be opposed to an upper part of the outlet 20*a* of the duct nozzle 20 from an upper side to a lower side. A part of the surface f is positioned on an upstream side in the conveying direction with respect to the outlet 20*a*. Further, the surface f is provided so as to be inclined upward toward the upstream side in the conveying direction.

The surfaces e and f form a substantially L-shaped recessed shape when viewed from the main scanning direction. The air shielding portion 40*a* is configured so that a front surface of the outlet 20*a* and an upper side of the outlet 20*a* are blocked and intercepted by the surface e and the surface f, respectively. As an advancing direction of the air blown out from the outlet 20*a* of the duct nozzle 20 and hitting the air shielding portion 40*a*, the air is configured to be detoured upward and released in the direction opposite to the conveying direction of the recording medium 2, released horizontally in the main scanning direction, or released downward.

Note that, when other duct nozzles 20 are adjacently arranged in the flowing direction of the air, the flow of the air released horizontally in the main scanning direction may be affected by the air sent from the outlets 20*a* of the duct nozzles 20 and advancing of the air may be blocked. Accordingly, the air is mainly released downward in the Z-direction as the direction of the air released by the air shielding portion 40*a*.

When blowing starts from the duct nozzle 20, air C hits the surface e of the air shielding portion 40*a* of the carriage 4*a* and is divided into air C3 toward the direction of an upper part at which the surface f is positioned and air C4 toward the direction of a lower part. In the extending direction of the surface e of the air shielding portion 40*a*, the opening portion 21 of the pinch roller holder 7*a* is positioned.

Therefore, the air C4 flowing in the direction of the lower part passes through the opening portion 21 and flows to a lower side of the pinch roller holder 7*a*.

From the above, the air sent from the outlets 20*a* of the duct nozzles 20 of the blowing units 15 flows through a surface to be recorded of the recording medium 2 on a platen 12 similarly to first embodiment, when the carriage 4*a* is not positioned between the duct nozzles 20 and the platen 12. This blowing enables the promotion of drying of ink immediately after the ink is dropped onto the recording medium 2 and the secured quality of a recording image.

On the other hand, the air direction is changed by the surfaces e and f of the air shielding portion 40*a* provided in the carriage 4*a* when the carriage 4*a* is positioned between the duct nozzles 20 and the platen 12, and particularly the air flowing to the direction of the lower part passes through the opening portion 21 of the pinch roller holder 7*a*. Thus, the air hardly flows through between the platen 12 and the recording head 3.

Particularly, if flow path resistance generated when the air flows through the opening portion 21 is smaller than flow path resistance generated when the air flows through a gap 23 between the air shielding portion 40*a* of the carriage 4*a* and the pinch roller holder 7*a*, much air flows to the opening portion 21 having the smaller flow path resistance. As a result of this, the air hardly flows through between the recording head 3 and the platen 12. For example, if a distance H of a gap 23 (first gap) between the air shielding portion 40*a* of the carriage 4*a* and the pinch roller holders 7*a* is narrower than a width G of an opening portion 21, the opening portion 21 has smaller relative flow path resistance.

Further, if the flow path resistance generated when the air flows through the opening portion 21 is smaller than flow path resistance generated when the air flows through a gap 22 (second gap) between the recording head 3 and a platen 12, the air hardly flows through between the recording head 3 and the platen 12. Similarly, if a distance J of the gap 22 between the recording head 3 and the platen 12 is narrower than the width G of the opening portion 21, the opening portion 21 has smaller relative flow path resistance.

As described above, the paths that change the air direction and release the air when the air sent from the duct nozzles 20 hits the carriage 4*a* are positively provided in the present embodiment as well. Thus, the air is prevented from flowing into the ejection port surface 30 below the recording head 3, and the ejection port surface 30 of the recording head 3 may be prevented from being exposed to the air. Thus, ink is prevented from being dried at ejection ports. Further, ink droplets dropped from the ejection ports of the ejection port surface 30 are prevented from causing the occurrence of landing deviation or the scattering of printing mist due to the influence of the air, and the degradation of image quality may be suppressed.

The configurations of the above respective embodiments may be combined together. Note that a configuration in which an air shielding portion (recessed portion) is integrated with a carriage is described in the embodiments, but the air shielding portion may be constituted by a member separate from the carriage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-210334, filed on Dec. 27, 2022, which is hereby incorporated by reference herein in its entirety.

What is claimed is:

1. A recording apparatus comprising:

a conveyance unit configured to convey a recording medium;

a platen configured to support the recording medium conveyed by the conveyance unit;

a carriage configured to support a recording head and configured to move in a scanning direction;

a blowing unit configured to send air to the recording medium supported by the platen, wherein the carriage has a recessed portion opposed to a blowing port of the blowing unit; and a pressing member that presses a surface to be recorded of the recording medium on an upstream side in a conveying direction of the recording medium relative to a recording area in which the recording head and the recording medium are opposed to each other, wherein the blowing unit is configured to be arranged above the pressing member and send the air to the recording area, wherein the recessed portion includes a first surface that is opposed to the blowing port in a blowing direction, and a second surface that extends in an opposite direction to the blowing direction from an upper end of the first surface, and wherein the pressing member has an opening portion that is opposed to at least a part of the second surface and penetrates the pressing member vertically.

2. The recording apparatus according to claim 1, wherein the recessed portion changes a direction of the air sent by the blowing unit.

3. The recording apparatus according to claim 1, wherein the second surface extends from one end of the first surface in a crossing direction to the blowing direction, and wherein the recessed portion includes a third surface that extends in the opposite direction from another end of the first surface in the crossing direction and that is opposed to the second surface.

4. The recording apparatus according to claim 3, wherein the blowing unit is configured to send the air obliquely downward to a recording area in which the recording head and the recording medium are opposed to each other, wherein the second surface extends obliquely upward from an upper end of the first surface, and wherein the third surface extends obliquely upward from a lower end of the first surface.

5. The recording apparatus according to claim 1, wherein the second surface extends obliquely upward from an upper end of the first surface.

6. The recording apparatus according to claim 1, wherein the opening portion is provided at a position separated from the recording area and at a higher position than a position at which the pressing member presses the surface to be recorded.

7. The recording apparatus according to claim 1, wherein flow path resistance of the opening portion is smaller than flow path resistance of a first gap formed between the carriage and the pressing member.

8. The recording apparatus according to claim 7, wherein the opening portion has a width larger than a width of the first gap in a cross section perpendicular to the scanning direction.

9. The recording apparatus according to claim 1, wherein flow path resistance of the opening portion is smaller than flow path resistance of a second gap formed between the recording head and the platen.

10. The recording apparatus according to claim 9, wherein the opening portion has a width larger than a width of the second gap in a cross section perpendicular to the scanning direction.

11. The recording apparatus according to claim 1, further comprising:

a guide rail that supports the carriage and guides movement in the scanning direction of the carriage, wherein the blowing port is provided on a downstream side of the guide rail and on an upstream side of the recording head in a conveying direction of the recording medium.

12. The recording apparatus according to claim 11, wherein the blowing port is provided below the guide rail and above a conveying path of the recording medium.

13. The recording apparatus according to claim 1, wherein a width in the scanning direction of a surface opposed to the blowing port in the recessed portion is same as or not less than a width in the scanning direction of the recording head.

14. The recording apparatus according to claim 1, wherein the recessed portion is a member separate from the carriage.

15. A recording apparatus comprising:

a conveyance unit configured to convey a recording medium;

a platen configured to support the recording medium conveyed by the conveyance unit;

a carriage configured to support a recording head and configured to move in a scanning direction;

a blowing unit configured to send air to the recording medium supported by the platen, wherein the carriage has a change portion that changes a direction of the air sent by the blowing unit; and a pressing member that presses a surface to be recorded of the recording medium on an upstream side in a conveying direction of the recording medium relative to a recording area in which the recording head and the recording medium are opposed to each other, wherein the blowing unit is configured to be arranged above the pressing member and send the air to the recording area, and wherein the pressing member has an opening portion that is opposed to the change portion and penetrates the pressing member vertically.

16. The recording apparatus according to claim 15, further comprising:

a guide rail that supports the carriage and guides movement in the scanning direction of the carriage, wherein a blowing port of the blowing unit is provided on a downstream side of the guide rail and on an upstream side of the recording head in a conveying direction of the recording medium.

17. The recording apparatus according to claim 16, wherein the blowing port is provided below the guide rail and above a conveying path of the recording medium.

18. The recording apparatus according to claim 15, wherein a width in the scanning direction of a surface opposed to a blowing port of the blowing unit in the change portion is same as or not less than a width in the scanning direction of the recording head.

* * * * *